Figure 1:
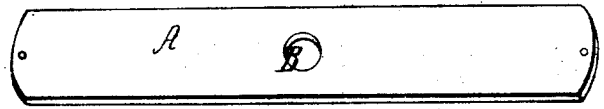
Figure 2:
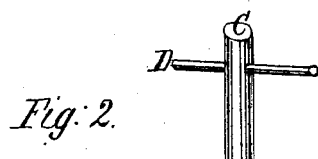
Figure 3:
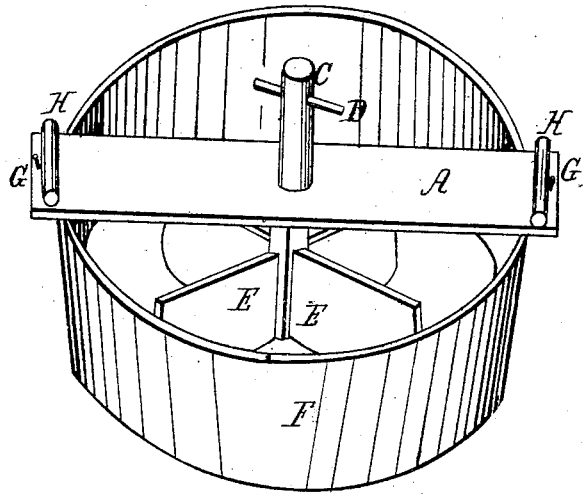

J. S. Hittell,
Washing Machine.

N° 61,067.     Patented Jan. 8, 1867.

Witnesses:
J. W. McKenzie
H. B. Livingston

Inventor:
John S. Hittell

United States Patent Office.

JOHN S. HITTELL, OF SAN FRANCISCO, CALIFORNIA.

*Letters Patent No. 61,067, dated January 8, 1867*

IMPROVED WASHING MACHINE.

*The Schedule referred to in these Letters Patent and making part of the same.*

Be it known that I, JOHN S. HITTELL, of the city and county of San Francisco, State of California, have invented a new and useful Washing Machine, consisting of an upright paddle-wheel, which can be placed in any common wash-tub, and is much more expeditious than the wash-board, thus furnishing a valuable, cheap, and simple addition to every household in which washing is done.

In the accompanying drawings representing the machine, A is a cross-board which passes over the top of the tub, and is held in its place by the bails, which turn up over the ends. B is a hole in the middle of the cross-board, through which hole the axle of the wheel passes. C is the axle of the wheel, held in its place while in use by the cross-board at the top and by a pivot or socket at the bottom of the tub. D is the handle passing through the axle, and made to be grasped by a hand at each end. E E E E are four paddles fastened to the axle. F is a common wash-tub. G G are pegs or nails driven into the ends of the cross-board to prevent the bails from slipping down over the ends after the board is fixed in its place.

I claim the combination of the wheel (made of the axle C, the paddles E E E E, and the handle D) with the cross-board A, and a pivot or socket at the base of the axle to keep it in place.

JOHN S. HITTELL.

SAN FRANCISCO, September 20, 1866.
Witnesses:
    H. B. LIVINGSTON,
    J. W. McKENZIE.